US008387026B1

(12) United States Patent
Hundt et al.

(10) Patent No.: US 8,387,026 B1
(45) Date of Patent: Feb. 26, 2013

(54) COMPILE-TIME FEEDBACK-DIRECTED OPTIMIZATIONS USING ESTIMATED EDGE PROFILES FROM HARDWARE-EVENT SAMPLING

(75) Inventors: Robert Hundt, Palo Alto, CA (US); Vinodha Ramasamy, Sunnyvale, CA (US); Dehao Chen, Beijing (CN)

(73) Assignee: Google Inc., Mountain View, CA (US)

( * ) Notice: Subject to any disclaimer, the term of this patent is extended or adjusted under 35 U.S.C. 154(b) by 994 days.

(21) Appl. No.: 12/343,635

(22) Filed: Dec. 24, 2008

(51) Int. Cl.
*G06F 9/45* (2006.01)
(52) U.S. Cl. .......... 717/140; 717/151; 717/153; 717/158
(58) Field of Classification Search .................. None
See application file for complete search history.

(56) References Cited

U.S. PATENT DOCUMENTS

| | | | | |
|---|---|---|---|---|
| 5,991,538 | A * | 11/1999 | Becker | 717/140 |
| 6,463,582 | B1 * | 10/2002 | Lethin et al. | 717/158 |
| 7,120,906 | B1 * | 10/2006 | Stephenson et al. | 717/158 |
| 2003/0061600 | A1 * | 3/2003 | Bates et al. | 717/133 |
| 2004/0117779 | A1 * | 6/2004 | Lagergren | 717/153 |
| 2004/0194077 | A1 * | 9/2004 | Bharadwaj et al. | 717/158 |
| 2005/0204348 | A1 * | 9/2005 | Horning et al. | 717/140 |
| 2005/0204349 | A1 * | 9/2005 | Lewis et al. | 717/162 |
| 2005/0246699 | A1 * | 11/2005 | Lagergren | 717/153 |
| 2006/0294510 | A1 * | 12/2006 | Hank et al. | 717/151 |
| 2007/0074193 | A1 * | 3/2007 | Talyansky | 717/148 |
| 2008/0177756 | A1 * | 7/2008 | Kosche et al. | 707/100 |
| 2009/0276766 | A1 * | 11/2009 | Song et al. | 717/159 |
| 2011/0035733 | A1 * | 2/2011 | Horning et al. | 717/140 |

OTHER PUBLICATIONS

Roy Levin et al., Complementing Missing and Inaccurate Profiling Using a Minimum Cost Circulation Algorithm, Third International Conference, HiPEAC 2008, Göteborg, Sweden, Jan. 27-29, 2008, 14 pages, <http://www.springerlink.com/content/j444437052584j16/>.*

Xiaolan Zhang et al.; "System Support for Automatic Profiling and Optimization"; 1997 ACM; pp. 15-26; <http://dl.acm.org/citation.cfm?id=266640>.*

Roy Levin et al.; "Complementing Missing and Inaccurate Profiling Using a Minimum Cost Circulation Algorithm"; 2008 Springer; pp. 291-304; <http://link.springer.com/chapter/10.1007%2F978-3-540-77560-7_20?LI=true#>.*

Grigori Fursin et al.; "MILEPOST GCC machine learning based research compiler"; Jun. 2008 ols.fedoraproject.org; 142 pages; <http://ols.fedoraproject.org/GCC/Reprints-2008/GCC-2008-Proceedings.pdf>.*

Ariel Tamches et al.; "Dynamic Kernel Code Optimization"; 2001 investigaction; 10 pages; <http://investigacion.ac.upc.es/conferencies/PACT01/wbt/tamches.pdf>.*

Matthew Arnold et al.; "A Framework for Reducing the Cost of Instrumented Code"; 2001 ACM; pp. 168-179; <http://dl.acm.org/citation.cfm?id=378832>.*

Jeffrey Odom et al.; "Using Dynamic Tracing Sampling to Measure Long Running Programs"; 2005 ACM/IEEE; 10 pages; <http://delivery.acm.org/10.1145>.*

* cited by examiner

*Primary Examiner* — Thuy Dao
*Assistant Examiner* — Cuong V Luu
(74) *Attorney, Agent, or Firm* — Honigman Miller Schwartz and Cohn LLP

(57) ABSTRACT

Traditional feedback-directed optimization (FDO) is not widely used due to the significant computational overhead involved in using instrumented binaries. The described embodiments provide methods that eliminate the need for instrumented binaries by permitting the conversion of hardware-event sampling information into edge frequencies usable by FDO compilers. Some advantages include: the ability to collect feedback data on production systems; the ability to perform FDO on the OS kernel; and the ability to avoid disrupting timing paths from instrumented binaries.

12 Claims, 3 Drawing Sheets

COMPILE-TIME FEEDBACK-DIRECTED OPTIMIZATIONS USING ESTIMATED EDGE PROFILES FROM HARDWARE-EVENT SAMPLING

BACKGROUND

Field

The present embodiments relate to techniques for compiling applications for optimized execution on computer systems. More specifically, the present embodiments relate to a method and system for using hardware-event sampling to perform feedback-directed optimization.

SUMMARY

Computer programs are written in general-purpose programming languages, i.e., C, C++, etc., and then compiled. The compilers for these programming languages use an array of optimization techniques to improve the performance of the computer programs they produce. One class of optimizations is feedback-directed optimization (FDO). FDO is different from other classes of compiler optimizations in that the required feedback comes from specially compiled instrumentation runs of the program with training data. These instrumentation runs produce edge profiles that can be used by an FDO compiler to further optimize the computer program's executable code.

The basic techniques for feedback-directed optimization (FDO) of computer executables, or binaries, is presently described with reference to FIG. 1, which illustrates a prior art process for feedback-directed optimization. The process 100 starts with building an instrumented binary (step 110), which produces an instrumented executable 120. Next, the instrumented executable 120 and training data 125 (generated separately) are run on appropriate computer hardware (step 130) to produce profile data 140, which directly describes edge profiles. Finally, a standard feedback-directed optimizing compiler is used to build an optimized executable 160 based on the profile data 140 (step 150).

This usage model presents a number of difficulties. For example, how is the training data 125 generated, how do you deal with the slowness of instrumented binaries (which can be 9-200% percent slower than a standard binary), and how do you manage the tightly coupled instrument-run-recompile process?

DETAILED DESCRIPTION

Overview

Compiler techniques that are used to improve the performance of computer executables can require complex mathematical analysis to eke out small performance gains. Recent trends toward feedback-directed optimization techniques have required the use of special executables, e.g., instrumented builds. Unfortunately, running these special executables can present a number of hurdles, such as how to generate the required training data, how to deal with the slow performance of the special executable and how to manage the tightly coupled instrument-run-compile process. The disclosed embodiments provide systems and methods to improve this process. For brevity, throughout this discussion, the terms "binary," "executable," "application," "program," and when used as a noun, the term "build" are all used interchangeably, and the singular female pronoun is used.

The discussion is organized as follows. First a high-level structure of one embodiment is described briefly. Next, the system is described in greater detail including the associated processes. Then, details of techniques used by embodiments are discussed. Lastly, various alternative embodiments are discussed.

Suppose a developer wishes to apply FDO optimizations to her new application, Widget Word. She can build a version of Widget Word using any compiler and any compiler options, including optimization settings, she desires. However, standard debugging information should be retained, e.g., the binary should not be stripped. At this point, she can begin using—and even distributing—Widget Word normally. By using the hardware-event sampling features of modern hardware processors, the developer can get hardware-event samples. For example, on the Intel Core® 2 platform, perfmon2 can gather INST_RETIRED event samples when Widget Word is running The gathered event samples can then be analyzed together with the debugging information in the application to match the events to lines of source code. Through further refinement and processes, the information can ultimately be converted into edge-profile frequencies. These edge-profile frequencies can then be used by existing feedback-directed optimizing (FDO) compilers to produce an optimized binary.

Notably, since hardware-event sampling imposes relatively modest overhead (2-4%), it can be used in production environments. Furthermore, because the two compilations are now decoupled, it is possible to deploy a first version of an application. This version can be used for some time to gather data from multiple production machines with real world inputs. This data can be used to produce an optimized version that can be distributed as an update. Note that this optimization-update process can be iterated multiple times.

Turning from this high-level description, the system is described in greater detail, infra, in terms of the associated systems and processes.

System and Processes

Figure 2:
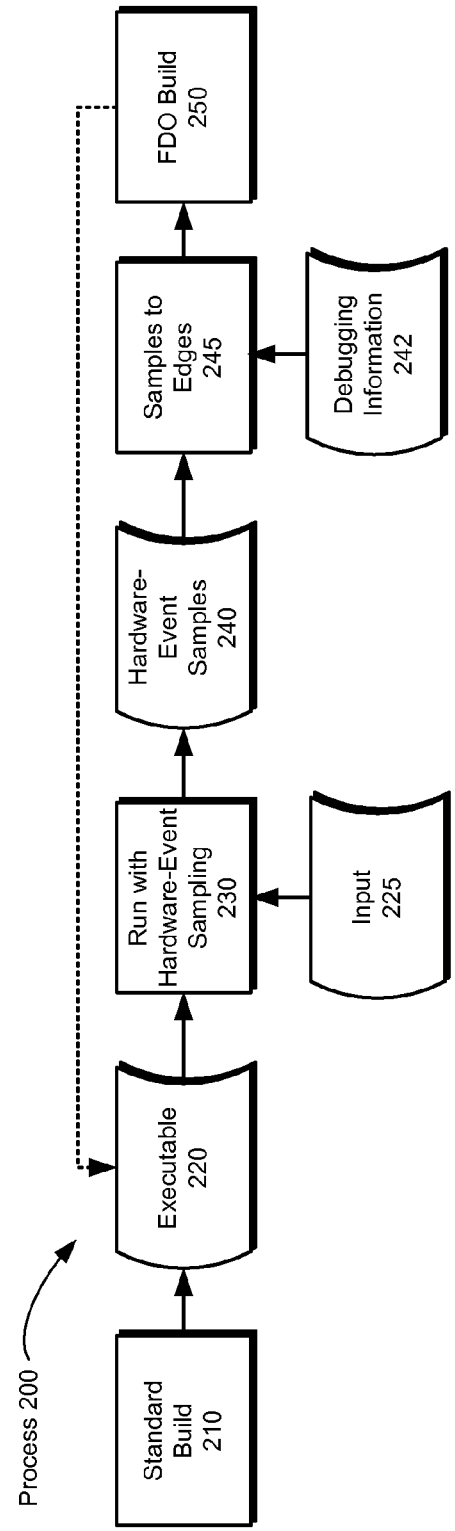
FIG. 2 illustrates an exemplary process for feedback-directed optimization according to one embodiment.

The system and processes for some embodiments will now be described with reference to FIG. 2 (process) and FIG. 3 (system). FIG. 2 illustrates an exemplary process for feedback-directed optimization according to one embodiment. In FIG. 2, various details have been omitted for clarity; for example, the source code is not shown and the location of various stored data (reference numerals 220, 225, 240, and 242) is not shown or discussed. The stored data can be stored in any computer-readable storage medium, such as on the storage 310 (FIG. 3), or in some network attached storage, not shown.

Process 200 starts with a standard build (step 210) of executable 220. This build is notable in that there is no instrumentation and any compiler and compilation flags may be used, e.g., -O2, -g, etc. Importantly, the resultant executable should not be stripped, so as to leave in place debugging information 242 (shown separately from the executable 220) which permits hardware-event samples 240 to be matched to specific lines of source code. The debugging information 242 is available in the standard binary output of compilers such as gcc and open64. Presently, for gcc this means that the -g option must be used to be able to obtain line number information, with suitable gcc modifications this would not be required.

Figure 1:
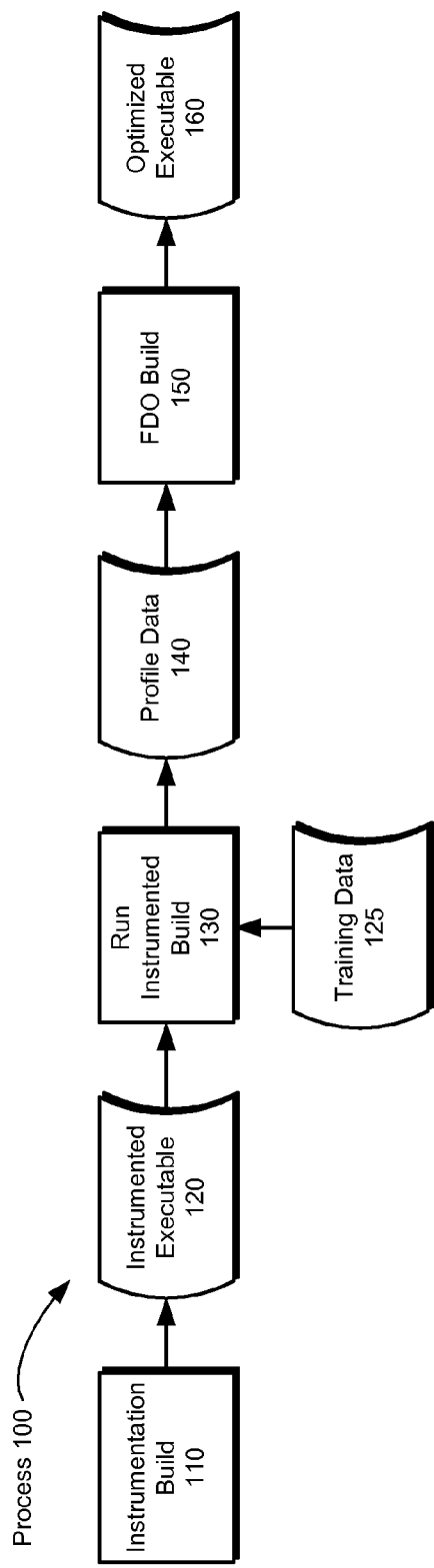
FIG. 1 illustrates a prior art process for feedback-directed optimization.

Next, the executable 220 is run with hardware-event sampling turned on (step 230). This can happen on the same machine being used for compilation, e.g., computer 300 in this example, or on multiple machines. These runs receive input 225 and, aside from the standard output, produce hardware-event samples 240, also called a data file. The distinguishing feature of input 225 is that it need not be specially generated training data, but can be any real world input. This is a useful departure from prior techniques such as that of FIG. 1, which required carefully designed training data 125.

In one embodiment, step 230 occurs across multiple computers coupled in communication to permit the output hardware-event samples 240, or data files, to be transmitted from one computer where the program executed to another computer for further processing. Consider one embodiment where the executable 220 is a search engine running on thousands of computers worldwide. In this embodiment, the initial build version X.Y.Z is distributed as the executable 220. Hence, step 230 can occur on computers throughout the world on a separately determined schedule. The input 225 can be the search queries from users "hitting" the search engine executables over the web. At a point when the developer decides that she wishes to resume process 200 and optimize the search engine, she can collect (or they may already have been collected) the hardware-event samples 240 from the various machines and aggregate them for step 245. After finishing step 245, the developer can build the optimized executable (step 250) and push the optimized executable into the cloud, e.g., version X.Y.Z-optl. This path is shown as the dotted line on FIG. 2. Further, the process can repeat multiple times.

Additionally, while the preceding embodiment was described as developer "attended," it can also run unattended according to a schedule set separately. For example, in one embodiment the executable could be optimized on a fixed time schedule. In another embodiment, every time a certain volume of hardware-event samples 240 become available, the executable is optimized. In another embodiment, the optimization is triggered by a signal, such as from a management console, or the like.

Returning to the discussion of process 200, the next step is step 245 where the hardware-event samples 240 are analyzed to compute basic block counts. The analysis is at a source-code level and uses the debugging information 242 to map the hardware-event samples 240 in the data file to lines of source code. The basic block counts are then converted to edge frequencies. The details of step 245 will be discussed in greater detail, infra, with reference to FIG. 4. Note that the edge frequencies can be generated in the current format used by existing FDO compilers, e.g., the FDO compiler used in step 150. Thus, the existing FDO compiler technologies and techniques can be used.

The output of step 250 of FIG. 2 is an optimized binary (not shown explicitly). The dotted line path highlights that the output binary can continue to be instrumented, thus continuing the process 200 as long as desired.

Before proceeding, a few other items are worth noting:
The operation of step 245 does not require perfect accuracy and is tolerant of missing event samples.

The event sampling of step 230 can be done in precise or non-precise modes (PEBS and non-PEBS on the Intel Core® 2 architecture) and with or without randomization of sampling frequency.

In non-randomized sampling (during step 230), if every n INST_RETIRED events is sampled, selecting n to be a prime number can mitigate the possibility of program synchronization with sampling, e.g., in the presence of loops.

Figure 3:
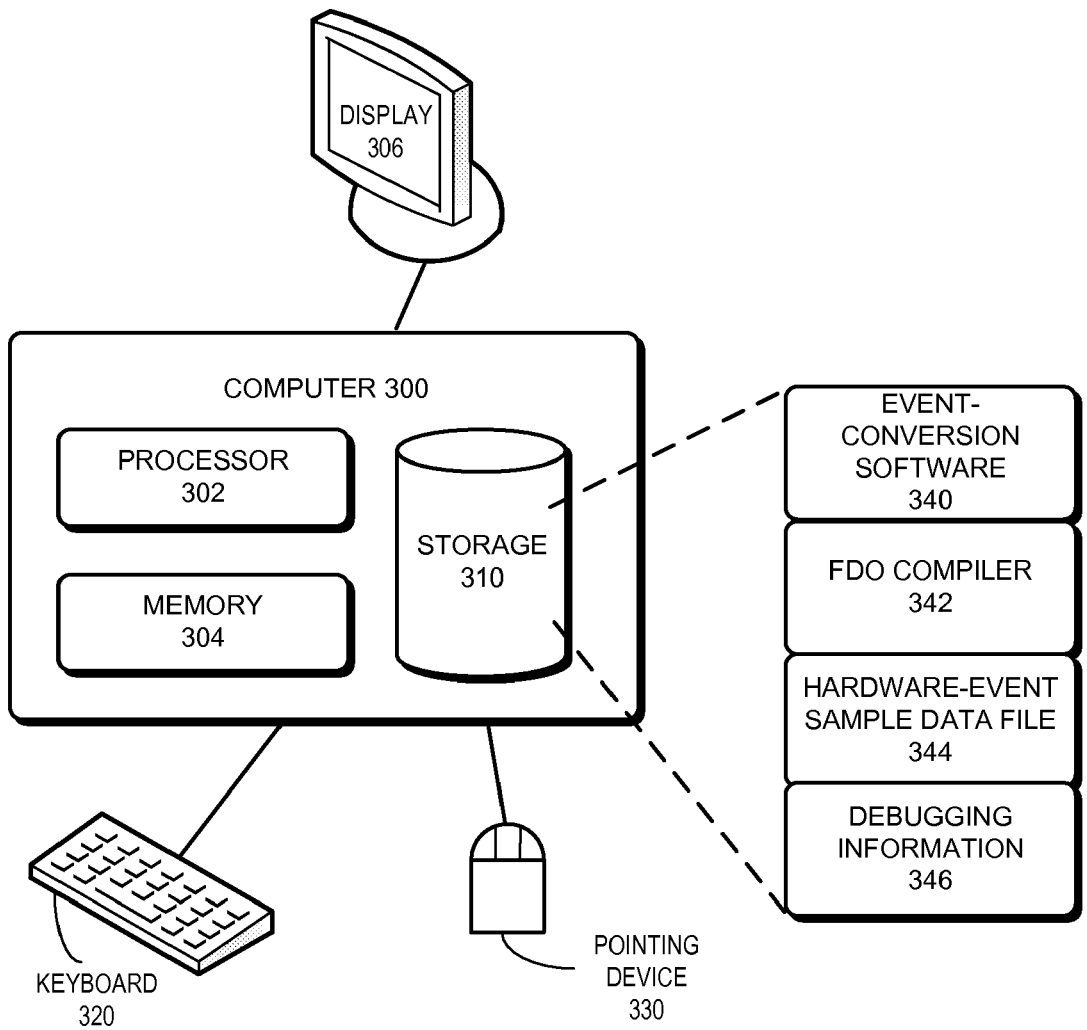
FIG. 3 illustrates a computer system used by some embodiments.

FIG. 3 illustrates a computer system used by some embodiments. The elements of FIG. 3 will now be described and then a discussion of their uses follows. FIG. 3 includes a computer 300, a display 306, and keyboard 320 and a pointing device 330. The computer 300 includes a processor 302, a memory 304, and a storage 310. The storage 310 includes a variety of computer programs, which will be discussed infra. The computer 300 can be an off-the-shelf computer, e.g., an IBM PC-compatible computer. In some embodiments, some or all of the storage 310 is network attached storage outside the computer 300. In some embodiments, the computer 300 is located remotely from the user input-output devices. Network communications equipment is omitted from the figure, but would often be present as it is a standard component on modern-day computers and would support some of the embodiments discussed supra.

The storage 310 includes event-conversion software 340, an FDO compiler 342, a hardware-event sample data file 344 (e.g., the hardware-event samples 240) and debugging information 346. Omitted, for clarity of illustration, are the source code, executable, operating system, any other compilers, developer tools, and the like, all of which may be in the storage 310.

The interrelationship between the elements of FIG. 3 and process 200 is as follows: FIG. 3 illustrates a computer 300 that can implement process 200. More specifically, the event-conversion software 340 can be used to implement step 245 and the FDO compiler 342 can be used to implement step 250.

Implementation Details

Figure 4:
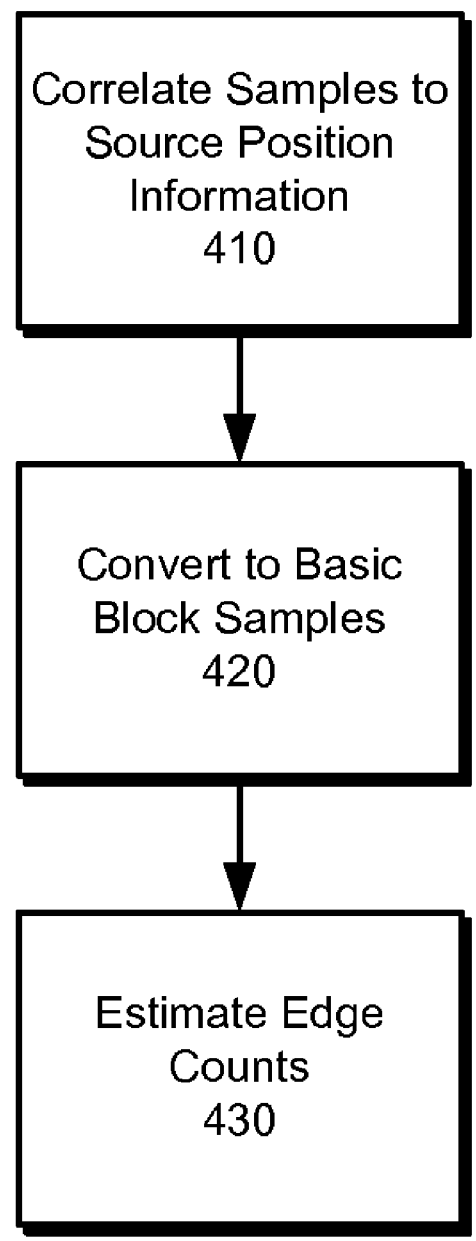
FIG. 4 illustrates a process for converting samples to edge profiles used by some embodiments.

Now detailed implementations will be discussed with reference to FIG. 4 which illustrates a process for converting samples to edge profiles used by some embodiments. Specifically, FIG. 4 shows process 400 which can implement step 245 of process 200. The process 400 will first be reviewed and then each step will be discussed in greater detail. At step 410, the samples, e.g., hardware-event samples 240, are analyzed and are correlated to source line, e.g., using the debugging information 242. Next, at step 420, basic-block counts are computed from the correlated hardware-event samples. Finally, at step 430, edge counts are estimated.

Turning to step 410 in more detail. The correlation requires an ability to correlate an event sample, e.g., of an INS T RETIRED, back to source code. Consider the source code line:

pbla.c:60 iplus=iplus->pred;

This single line of C programming language code might translate into multiple instructions, shown here as assembly language:

804a8b7: mov 0x10(% ebp), % eax
804a8ba: mov 0x8(% eax), % eax
804a8bd: mov % eax, 0x10(% ebp)
804a8c0: jmp 804a94b <primal_iminus+0x137>

The hardware-event samples in the data file (e.g., hardware-event samples 240) would be for the specific instructions, e.g., the first mov instruction might have been sampled 100 times, the next 30, the last 70, and the jmp 80 times.

Thus, at step 410, the correlation of the samples to the line of code would occur, e.g., pbla.c, line 60, has a total of 280 samples (100+30+70+80). In one embodiment, the average is computed here, e.g., 70. In an alternate embodiment, the number of samples, 280, and the number of instructions, 4, are maintained and then aggregated across all source lines in a basic block at step 420. Since the data is sampled, some of the instructions corresponding to line 60 may have no events or a significantly different quantity of events in the data file. The handling of this situation is addressed in step 430.

Next, at step 420, the number of samples per basic block is computed. The blocks can be identified using the intermediate representation (IR) of the source code and a compiler. In one embodiment, a compiler is used at step 245 to build the IR and compute basic block (BB) counts from the IR. In another embodiment, step 245 and step 250 occur simultaneously with modifications to the FDO compiler being used at step 250 to carry out process 400 prior to carrying out the FDO by constructing edge profiles.

Returning to the computation of step 420, if a basic block has five statements from the source code (or IR), then the sum of samples from each can be averaged. For example, in discussing step 410, we considered a statement that had 70 samples, if the other four statements in the block had 10, 70, 0, and 0 samples, then the total number of samples for the basic block would be 150. With five statements, the BB count would be 30 (150/5). If the late averaging embodiment touched on earlier is used, then the number of samples and instructions per source line would be summed as groups and divided to come up with the BB count.

The final step of process 400 is step 430 where an estimated edge-frequency profile is computed from the basic block counts. This can be done by converting the estimation problem into a minimum-cost maximal flow problem. In some embodiments, this is done in accordance with the general approach in "*Complementing Missing and Inaccurate Profiling Using a Minimum Cost Circulation Algorithm*" by Roy Levin, Ilan Newman, and Gadi Haber, HiPEAC, pp 291-304 (2008). Bear in mind that the minimum-cost circulation problem and the minimum-cost maximal flow problem are equivalent. The specific approach used by some embodiments will now be discussed in greater detail.

The flow-conservation rule chosen is that for each vertex in a procedure's control-flow graph (CFG), the sum of the incoming edge frequency counts should be equal to the sum of the outgoing edge frequency count. Conceptually, limiting the amount of change based on static prediction (i.e., by the compiler without the benefit of execution data) coupled with the flow-conservation rule will permit a good approximation of edge counts (i.e., as compared with data gathered from an instrumented executable).

The first portion of step 430 will involve the conversion to a minimum-cost maximal-flow problem. Specifically, the original control-flow graph (CFG) will be transformed into a fixup graph, and for all edges in the fixup graph, the minimum capacity, maximum capacity, and cost of each edge will be computed. Some notation and setup follows:

G=(V,E): the original CFG with initial weights $\forall \langle u,v \rangle \in E$: $w(\langle u,v \rangle) \leftarrow w(u)*p(\langle u,v \rangle)$, where $w(u)$ is the sample count of the basic block u, and $p(\langle u,v \rangle)$ is the probability of the edge $\langle u,v \rangle$ as determined from static profiles, e.g., as in Thomas Ball and James R. Lams, "*Optimally Profiling and Tracing Programs*," ACM Transactions on Programming Languages and Systems, 16(4):1319-1360, July 1994.

G'=(V',E'): the fixup graph min(e), max(e): minimum and maximum capacities for flow on each edge, e in E' k(e): confidence constant for any edge e in E', values are set as:

$$b=\sqrt{\text{avg\_vertex\_weight(cfg)}}$$

$$k^+(e)=b$$

$$k^-(e)=50b$$

where $k^+(e)$ is used when increasing the flow and $k^-(e)$ is used when decreasing the flow.

Cost-coefficient function for the edges:

$$cp(e) = \frac{k'(\Delta(e))}{\ln(w(e)+2)}$$

where w(e) is the initial assignedge weight and
  if $\Delta(e) \geq 0$ then $k'(\Delta(e))=k^+$
  otherwise, $k'(\Delta(e))=k^-$
and where $\Delta(e)$ is the change in edge flow, cost function is per unit flow.

These values ensure that the cost of decreasing the weight on an edge is significantly larger than increasing the weight on an edge, and higher confidence in the initial value of e results in a higher cost for changing the weight of that edge.

The fixup graph and related output can be constructed as follows:
1. Vertex Transformation: construct $G_t=(V_t,E_t)$ from G by doing vertex transformations. For $\forall v \in V$, split each vertex v into two vertices v' and v", connected by an edge with the weight of that edge set to the basic block count of v.
2. Initialize: For each vertex $v \in V_t$ let for $$D(v) = \sum_{e_i \in out(v)} w(e_i) - \sum_{e_j \in in(v)} w(e_j);$$

each $e \in E_t$, do:
    min(e)←0
    max(e)←∞
    k'(e)←$k^+$(e)
    $E_r$←∅
    L←∅
3. Add Reverse Edges: For each $e=\langle u,v \rangle \in E_t$ such that $e_r=\langle v,u \rangle \notin E_t$, do:
  add edge $e_r$
  min($e_r$)←0
  max($e_r$)←w(e)
  k'($e_r$)←$k^-$(e)
  $E_r$←$E_r \cup \{e_r\}$
4. Create Single Source and Sink: Add a source vertex s' and connect it to all function entry vertices, and add a sink vertex t' and connect it to all function exit vertices.
  $\forall s \in S$ where S is the set of function entry vertices, do:
    add edge $e_s=\langle s',s \rangle$
    min($e_s$)←0, max($e_s$)←w(s), cp($e_s$)←0
    L←L∪{$e_s$}
  $\forall t \in T$ where T is the set of function exit vertices, do:
    add edge $e_t=\langle t,t' \rangle$
    min($e_t$)←0, max($e_t$)∴w(t), cp($e_t$)←0
    L←L∪{$e_t$}
5. Balance Edges: for each $v \in V_t/(S \cup T)$ do:
  if D(v)≥0: add edge $v_t=\langle v,t \rangle$, min($v_t$)←D(v), max($v_t$)←D(v), and L←L∪{$v_t$} otherwise: add edge $v_s=\langle s',v\rangle$, $\min(v_s)\leftarrow -D(v)$, $\max(v_s)\leftarrow -D(v)$, and $L\leftarrow L\cup\{v_s\}$ 6. Normalization: This stage removes anti-parallel edges. Anti-parallel edges are created by the vertex transformation at stage 1 from self-edges in the original CFG G as well as by the reverse edges added at stage 3. $\forall e=\langle u,v\rangle \in E_t\cup E_r$, such that $e_r=\langle v,u\rangle \in E_t\cup E_r$, do:
add new vertex n
delete edge $e_r=\langle v,u\rangle$
add edge $e_{vn}=\langle v,n\rangle$, with $k'(e_{vn})\leftarrow -0.5*k'\langle u,v\rangle$, $\min(e_{vn})\leftarrow 0$ and $\max(e_{vn})\leftarrow \max(\langle u,v\rangle)$
add edge $e_{nu}=\langle n,u\rangle$, with $k'(e_{nu})\leftarrow k'\langle v,u\rangle$, $\min(e_{nu})\leftarrow 0$ and $\max(e_{nu})\leftarrow \max(\langle v,u\rangle)$
$k'(\langle u,v\rangle)\leftarrow -0.5*k'(\langle u,v\rangle)$
$E'\leftarrow E'\cup\{e_{vn},e_{nu}\}$
$V'\leftarrow V'\cup\{n\}$
7. Finalize: $E'\leftarrow E'\cup E_t\cup E_r\cup L$ and $V'\leftarrow V'\cup V_t$ With the fixup graph and the minimum capacity (min(e)), maximum capacity (max(e)) and edge costs (cp(e)) calculated, step 430 can continue by solving the minimum-cost maximal-flow problem.

One embodiment uses Klein's negative cycle cancellation techniques as follows:
1. Find maximal flow, using Edmonds-Karp's breadth-first search techniques to find augmenting paths;
2. Compute residual network;
3. Repeatedly cancel negative cost cycles, using Ford-Fulkerson techniques to find negative cost cycles; and
4. Form minimum-cost maximal-flow network.

Other embodiments may use other techniques in place of Klein's, for example Goldberg and Tarjan's technique, to solve the minimum-cost circulation problem could be used.

Some additional implementation considerations merit discussion. In one embodiment an existing compiler with instrumentation-based FDO support such as gcc is modified to support process 200. In this embodiment, step 245 (including process 400) and step 250 are merged into a single compiler executable. In one embodiment, the -fsample-profile option has been added to trigger this embodiment. In this embodiment, process 400 is carried out by adding new functions to the existing code to perform process 400 using hardware-event sample data files during compilation. Consider the basic flow of gcc version 4.4:
source⇒ generic⇒ gimple⇒ RTL⇒ assembly If invoked with the new -fsample-profile option, then new code for sp_annotate( ) in pass_tree_sample_profile is invoked to read the data file (e.g, hardware-event samples 240) and enable existing FDO capabilities. This function performs step 410 and step 420 of process 400 before calling sp_smooth_cfg ( ) to perform step 430 (e.g., construct fixup graph and apply minimum-cost maximal-flow technique). Because the output of sp_smooth_cfg( ) is edge profiles already well understood by the instrumented compiler, no further modifications to the extent FDO code are needed.

In using process 200 and process 400, some attention should be paid to sampling methodology and missing or insufficient source positioning information. For example, INST_RETIRED event counts may not always be representative of the actual instruction count because of: program synchronization, hardware, the choice of profiling tools to collect the data, and/or other reasons. Randomizing sampling frequency (a supported feature of Intel Core® 2 processors) or picking a prime number for the sampling frequency can minimize the problem of program synchronization. Hardware factors such as out-of-order execution may cause skewing of the recorded instruction address, e.g., hardware-event sample says instruction was at 804a8ba, but the actual location was several bytes off. In testing, the AMD Opteron™ with up to 72 macro-ops in flight can demonstrate this problem. On the Intel Core® 2 platform, the precise event-based sampling (PEBS) mode can minimize this at the cost of not permitting randomized sampling. Also, the profiling tool used, e.g., perfmon2 (preferred) vs. oprofile, can affect the outcome based on its ability to interface with the processor's hardware sampling mechanisms.

Missing or insufficient source position information also can reduce accuracy. Improving the underlying compiler used in process 200 (for the initial and/or FDO build) can reduce this problem. For example, gcc with -O2 showed some problems. Specifically, consider this small excerpt from the SPEC2000 benchmark 300. twolf procedure new_dbox( ) annotated with hardware-event samples after the "//" comment characters:

```
93 if (netptr->flag == 1) {        // 31366
94     newx = netptr->newx;         //  3000
95     newptr->flax = 0 ;           // 37000
96 } else {                         //     0
97     newx = oldx ;                //     0
98 }                                //     0
```

Taken at face value, lines 96-98 were never sampled during the collection runs.

However, testing with traditional instrumented builds showed that those blocks executed around 19% of the time. Further analysis of this specific code revealed that standard optimizations by the compiler caused mis-attribution of samples. Accordingly, some modifications to the existing compilation processes may be helpful to provide better samples at step 245 and step 250.

A related problem can arise from control-flow statements on single lines, e.g.
if (cond) {stmt1} else {stmt2}
(cond) ? (taken_body) : (not_taken_body);
In these situations, it is not possible to disambiguate the samples to the correct blocks presently. The compiler would need to be enhanced to discriminate control transfers within a single source line. Inlined functions and macros can present similar challenges.

ALTERNATIVE EMBODIMENTS AND CONCLUSION

Some additional embodiments will now be discussed. In one embodiment, sample data taken from a first version of the executable (e.g., x.y.A) is used to perform FDO on a second version (e.g., x.y.B). That may work particularly well with software developed using so-called agile development processes with frequent releases (release early, release often) and relatively modest source code changes. Specifically, in one embodiment, when compiling the second version as part of process 200 (at step 245 and step 250) the hardware-event samples 240 for the first version are used. In this embodiment, additional steps need to be taken in process 400 to identify changed files and/or lines of code. In one embodiment, the prior data files are only used for unmodified source code files. In another embodiment, source code is matched at the function level and any unchanged functions are optimized. Notably, this approach works because the process is predicated on working from samples that have some degree of missing or incomplete data as opposed to precise measurements.

Recapping, improved approaches to FDO compilation have been described. Specifically, the need to build a special, instrumented binary has been eliminated. Instead, hardware-event samples such as the INST_RETIRED event are captured at low overhead. The samples are then correlated with source code, then basic blocks, and finally converted to edge profiles. This has the advantage that existing FDO compilers and compilation techniques can take advantage of the improved approach. This approach opens up new areas for FDO, e.g., time-sensitive code such as OS kernels, and brings the technique into the every-day space by eliminating the complex dual-build and test data construction process. Also, because the processes can be applied repeatedly, the same executable can be optimized multiple times as more sample data becomes available—possibly from an array of production machines periodically using the hardware-event sampling.

The data structures and code described, supra, are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), network storage, or other media capable of storing computer-readable media now known or later developed.

The preceding description is presented to enable one skilled in the art to make and use the embodiments. Various modifications to the disclosed embodiments will be apparent, and the general principles defined herein may be applied to other embodiments and applications without departing from the spirit and scope of the present embodiments. Thus, the present embodiments are not intended to be limited to the embodiments shown, but is to be accorded the widest scope consistent with the principles and features disclosed herein. The scope of the present embodiments are defined by the appended claims.

What is claimed is:

1. A computer-implemented method for optimizing executable code during compilation of the executable code, the method comprising:
   loading a data file containing a plurality of hardware-event samples;
   loading debugging information which is sufficient to permit identification of source code positions from the hardware-event samples;
   at a source-code level, analyzing the hardware-event samples of the data file and the debugging information to map the hardware-event samples to lines of source code;
   computing a plurality of basic block counts using an average of the average number of samples per source line in a basic block;
   converting the plurality of basic block counts into a plurality of edge frequencies, wherein the converting comprises transforming the problem into a minimum-cost circulation problem with a flow-conservation rule, wherein the flow-conservation rule is the sum of incoming edge frequency counts should equal the sum of outgoing edge frequency counts; and
   compiling the executable code using a feedback-directed optimizing compiler and the plurality of edge frequencies.

2. The method of claim 1, wherein the feedback-directed optimizing compiler can be any feedback-directed optimizing compiler capable of using edge frequency data.

3. The method of claim 1, wherein the hardware-event samples are hardware-event samples of instruction-retired events.

4. The method of claim 1, wherein the basic block counts are computed using the average of all samples in all source lines in a basic block.

5. A system having a computing processor for optimizing an executable code during compilation of the executable code, comprising:
   a feedback-directed optimizing compiler executing on the computing processor and configured to compile the executable code from a plurality of source code and a plurality of edge frequencies; and
   a hardware-event sample converter module executing on the computing processor and configured to:
   load a data file containing a plurality of hardware-event samples;
   load a debugging information which is sufficient to permit identification of source code positions from the hardware-event samples;
   at a source-code level, analyze the hardware-event samples of the data file and the debugging information to map the hardware-event samples to lines of source code;
   compute a plurality of basic block counts using an average of the average number of samples per source line in a basic block;
   convert the plurality of basic block counts into a plurality of edge frequencies, wherein the converting comprises transforming the problem into a minimum-cost circulation problem with a flow-conservation rule, wherein the flow-conservation rule is the sum of incoming edge frequency counts should equal the sum of outgoing edge frequency counts; and
   compile the executable code using a feedback-directed optimizing compiler and the plurality of edge frequencies.

6. The system of claim 5, wherein the feedback-directed optimizing compiler can be any feedback-directed optimizing compiler capable of using edge frequency data.

7. The system of claim 5, wherein the hardware-event samples are hardware-event samples of instruction-retired events.

8. The system of claim 5, wherein the basic block counts are computed using the average of all samples in all source lines in a basic block.

9. A non-transitory computer-readable storage medium storing instructions that when executed by a computer cause the computer to perform a method for optimizing executable code during compilation of the executable code, the method comprising:
   a first set of instructions for loading a data file containing a plurality of hardware-event samples;
   a second set of instructions for loading a debugging information which is sufficient to permit identification of source code positions from the hardware-event samples;
   a third set of instructions at a source-code level for analyzing the hardware-event samples of the data file and the debugging information to map the hardware-event samples to lines of source code, the third set of instructions for computing a plurality of basic block counts using an average of the average number of samples per source line in a basic block;
   a fourth set of instructions for converting the plurality of basic block counts into a plurality of edge frequencies;
   a fifth set of instructions for compiling the executable code using a feedback-directed optimizing compiler and the plurality of edge frequencies; and the converting comprises a sixth set of instructions for transforming the problem into a minimum-cost circulation problem with a flow-conservation rule, wherein the flow-conservation rule is the sum of incoming edge frequency counts should equal the sum of outgoing edge frequency counts.

10. The non-transitory computer-readable storage medium of claim 9, wherein the feedback-directed optimizing compiler can be any feedback-directed optimizing compiler capable of using edge frequency data.

11. The non-transitory computer-readable storage medium of claim 9, wherein the hardware-event samples are hardware-event samples of instruction-retired events.

12. The non-transitory computer-readable storage medium of claim 9, wherein the basic block counts are computed using the average of all samples in all source lines in a basic block.

\* \* \* \* \*